United States Patent
Kim et al.

(10) Patent No.: US 9,692,866 B2
(45) Date of Patent: Jun. 27, 2017

(54) DIGITAL DEVICE FOR COPYING DIGITAL CONTENTS BY SCREEN OVERLAP AND CONTROLLING METHOD THEREOF

(71) Applicant: LG ELECTRONICS INC., Seoul (KR)

(72) Inventors: Jihwan Kim, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 329 days.

(21) Appl. No.: 14/528,922

(22) Filed: Oct. 30, 2014

(65) Prior Publication Data

US 2016/0062564 A1    Mar. 3, 2016

(30) Foreign Application Priority Data

Sep. 2, 2014  (KR) .......................... 10-2014-0116085

(51) Int. Cl.
*G06F 3/0482* (2013.01)
*H04M 1/725* (2006.01)

(52) U.S. Cl.
CPC .... *H04M 1/72522* (2013.01); *H04M 1/72591* (2013.01)

(58) Field of Classification Search
CPC ................................................ H04M 1/72519
See application file for complete search history.

(56) References Cited

U.S. PATENT DOCUMENTS

| | | | | |
|---|---|---|---|---|
| 4,763,356 A * | 8/1988 | Day, Jr. | ................. | G06F 3/0488 178/18.01 |
| 5,450,538 A * | 9/1995 | Glaser | ................... | G06F 3/0481 715/236 |
| 5,651,107 A * | 7/1997 | Frank | .................... | G06F 3/0481 345/589 |
| 6,577,330 B1* | 6/2003 | Tsuda | .................. | G06F 3/04815 715/781 |
| 8,392,788 B2* | 3/2013 | Calderon | .............. | H04L 1/0057 714/752 |
| 8,448,061 B1* | 5/2013 | Linburn | ................ | G06F 17/243 715/224 |
| 8,656,294 B2 | 2/2014 | Wässingbo | | |
| 2002/0171682 A1* | 11/2002 | Frank | .................... | G06F 3/0481 715/790 |
| 2008/0195969 A1* | 8/2008 | Brown | .................. | G06F 3/0486 715/802 |
| 2009/0049375 A1* | 2/2009 | Aughenbaugh | ....... | G06F 17/242 715/253 |

(Continued)

FOREIGN PATENT DOCUMENTS

EP        2 527 984 A1    11/2012

*Primary Examiner* — Jun-Mu Chuang
(74) *Attorney, Agent, or Firm* — Birch, Stewart, Kolasch & Birch, LLP

(57) ABSTRACT

The present specification discloses a digital device and controlling method thereof, by which digital contents can be copied by screen overlap. The digital contents display a first screen and a second screen on a first layer and a second layer, respectively. And, the digital content included in the second screen located in a region corresponding to an input window region included in the first screen to an input window of the first screen. As a process so-called 'COPY and PASTE', a digital content is copied to a screen-overlapped location on a display.

13 Claims, 7 Drawing Sheets

(56) References Cited

U.S. PATENT DOCUMENTS

| | | | |
|---|---|---|---|
| 2009/0287992 A1* | 11/2009 | Bresolin | G06Q 10/06 |
| | | | 715/226 |
| 2010/0127997 A1 | 5/2010 | Park et al. | |
| 2011/0194770 A1* | 8/2011 | Kim | G06K 9/00456 |
| | | | 382/176 |
| 2011/0205160 A1 | 8/2011 | Song et al. | |
| 2012/0166989 A1 | 6/2012 | Brown et al. | |
| 2013/0124961 A1* | 5/2013 | Linburn | G06F 17/243 |
| | | | 715/224 |
| 2013/0170751 A1* | 7/2013 | Qiu | G06K 9/36 |
| | | | 382/177 |
| 2013/0339889 A1* | 12/2013 | Bastide | G06F 9/4443 |
| | | | 715/770 |
| 2014/0157168 A1* | 6/2014 | Albouyeh | G06F 3/0484 |
| | | | 715/770 |
| 2015/0334138 A1* | 11/2015 | Conklin | G06F 3/1423 |
| | | | 715/753 |

\* cited by examiner

DIGITAL DEVICE FOR COPYING DIGITAL CONTENTS BY SCREEN OVERLAP AND CONTROLLING METHOD THEREOF

Pursuant to 35 U.S.C. §119(a), this application claims the benefit of earlier filing date and right of priority to Korean Application No. 10-2014-0116085, filed on Sep. 2, 2014, the contents of which are hereby incorporated by reference herein in their entirety.

BACKGROUND OF THE INVENTION

Field of the Invention

The present specification relates to a digital device and controlling method thereof. Although the present specification is suitable for a wide scope of applications, it is particularly suitable for copying digital contents by screen overlap.

Discussion of the Related Art

Recently, as digital devices including smartphones, tables PCs and the like become more portable owing to the latest technological developments, they have spread globally. Generally, a digital device is equipped with a large-scale display provided to its front side. And, the display normally configures a mutually layered structure (i.e., a touchscreen) with a touch sensor capable of recognizing an user's touch input. The digital device can drive various applications. And, the digital device can move such a digital content contained in a prescribed application as an image, a text and the like to another application by an user's selection.

An action of moving a digital content from one application to another application is generally called 'COPY and PASTE'. A process of 'COPY and PASTE' is further facilitated in a keyboard or mouse provided environment such as a desktop and the like. However, if a mobile device has an user input interface configured with a touchscreen only, it requires variously complicated several steps.

For instance, assume a situation that an user needs to input a multitude of texts included in one application to an input window of another application in the course of using a mobile device. In doing so, the user exits a currently used application and then moves to a different application including the texts. Subsequently, the user inputs the texts through an interface provided by a digital device so that the inputted texts are saved in such a temporary storage device as a buffer and the like. The user returns to the initially used application and then makes an input through the interface provided by the digital device in order to read the texts saved in the temporary storage device.

Thus, the demand for a simple and convenient input method is rising to settle the inconvenience caused by the many steps and the complicated process.

SUMMARY OF THE INVENTION

Accordingly, the present specification is directed to a digital device for copying digital contents by screen overlap and controlling method, which may substantially obviate one or more of the problems due to limitations and disadvantages of the related art.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the present specification, as embodied and broadly described herein, a digital device according to the present specification may include a sensor unit configured to detect an user input, the sensor unit configured to output a signal in accordance with the detected input, a display unit configured to output an image having a plurality of layers, and a control unit configured to receive the signal from the sensor unit, the control unit configured to control the display unit, wherein the control unit controls display of a first screen of a first application on a first layer by receiving a first signal from the sensor unit, wherein after displaying the first screen on the first layer, the control unit controls display of a second of a second application on a second layer by receiving a second signal, and wherein after displaying the second screen on the second layer, the control unit inputs digital content included in the second screen located in a region corresponding to an input window region included in the first screen to an input window of the first screen by receiving a third signal from the sensor unit.

According to one embodiment of the present specification, when the first signal is received, the control unit may raise a transparency of the first screen and display the second layer on a layer lower than the first layer. In doing so, the control unit may adjust the transparency of the first screen by receiving a transparency adjust signal from the sensor unit.

Meanwhile, the control unit may control a transparency of the input window region included in the first screen to be raised higher than that of a region of the first screen except for the input window. In doing so, when a plurality of input windows is included in the first screen, the control unit may receive an input window select signal from the sensor unit and then raise the transparency of the input window corresponding to an user's selection only.

When the third signal is received, the control unit may lower the transparency of the first screen.

According to another embodiment of the present specification, when the second signal is received, the control unit may raise a transparency of the second screen and display the first layer on a layer lower than the second layer.

According to one embodiment of the present specification, after displaying the first screen on the first layer, the control unit may provide the display unit with an interface including all screens of currently running applications.

According to one embodiment of the present specification, the control unit may shift a location at which the first screen or the second screen is displayed by receiving a shift signal from the sensor unit.

According to one embodiment of the present specification, the control unit may adjust a size of the input window included in the first screen by receiving a size adjust signal from the sensor unit.

According to one embodiment of the present specification, the control unit may adjust a location of the input window included in the first screen by receiving a location adjust signal from the sensor unit.

According to one embodiment of the present specification, when the digital content comprises a plurality of texts, the control unit may provide the display unit with a text region select interface for selecting the texts entirely or in part. When the third signal is received, the control unit may input the texts selected entirely or in part through the text region select interface to the input window of the first screen.

According to one embodiment of the present specification, when the digital content includes an image, the control unit may provide the display unit with an image region select interface for selecting the image entirely or in part. When the third signal is received, the control unit may input the image selected entirely or in part through the image region select interface to the input window of the first screen.

According to one embodiment of the present specification, when the digital content includes an image containing a text image, the control unit may convert the text image to text data through optical character recognition (OCR). When the third signal is received, the control unit may input the converted text data to the input window of the first screen.

According to one embodiment of the present specification, if the digital content includes an image containing a text image, the control unit may provide the display unit with a text input interface. When the third signal is received, the control unit may input text inputted through the text input interface to the input window of the first screen.

According to one embodiment of the present specification, if the digital content includes an image, the control unit may save a part corresponding to the region of the input window included in the first screen as image data. When the third signal is received, the control unit may input the saved image data to the input window of the first screen.

To achieve these objects and other advantages and in accordance with the purpose of the present specification, as embodied and broadly described herein, a method of controlling a digital device according to the present specification may include receiving a first signal from a sensor unit configured to detect an user input and then output a signal in accordance with the detected input; an user input displaying a first screen of a first application on a first layer; displaying a second screen of a second application on a second layer by receiving a second signal from the sensor unit; and inputting digital content included in the second screen located in a region corresponding to an input window region included in the first screen to an input window of the first screen by receiving a third signal from the sensor unit.

According to one aspect of the present specification, it is able to perform 'COPY and PASTE' job on a digital content with a simple and convenient manipulation.

According to another aspect of the present specification, it is able to selectively input an user-desired portion of a digital content or the whole digital content.

According to further aspect of the present specification, since an user is able to simultaneously view two kinds of screens by overlap, it is unnecessary for the user to memorize a text content in case of directly inputting a text.

Effects or advantages obtainable from the present specification may be non-limited by the above mentioned effects. And, other unmentioned effects can be clearly understood from the following description by those having ordinary skill in the technical field to which the present specification pertains. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Reference will now be made in detail to the preferred embodiments disclosed in the present specification, examples of which are illustrated in the accompanying drawings. The configurations and functions of embodiments in the present specification, which are illustrated in the accompanying drawings and described with reference to the accompanying drawings, are described as at least one embodiment, by which the technical idea, core configurations and functions of the present specification are non-limited.

Figure 1:
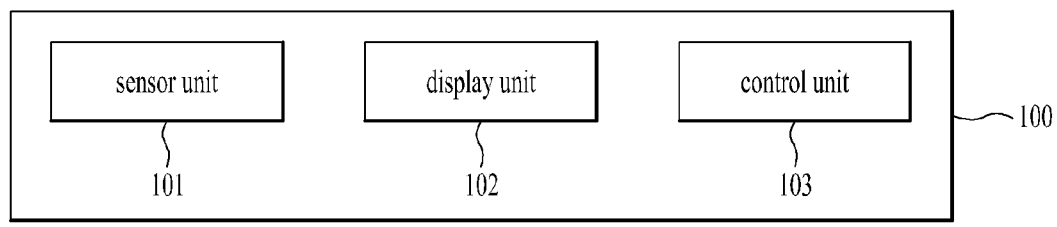
FIG. 1 is a schematic block diagram of a configuration of a digital device according to the present specification.

FIG. 1 is a schematic block diagram of a configuration of a digital device according to the present specification.

Referring to FIG. 1, a digital device 100 according to the present specification includes a sensor unit 101, a display unit 102 and a control unit 103.

The sensor unit 101 detects or senses an user input and is able to output a signal in accordance with the detected input. In particular, the signal may be outputted to the control unit 103.

The sensor unit 10 may include various sensing means including a gravity sensor, a geomagnetic sensor, a motion sensor, a gyro sensor, an acceleration sensor, an infrared ray sensor, an inclination sensor, a pressure sensor, a bending sensor, an audio sensor, a video sensor, a touch sensor, a fingerprint sensor and the like. The sensor unit 191 is a generic name of the above-mentioned various sensing means. The sensor unit 101 detects various user inputs and may output signals in accordance with the detected inputs. The above-described sensors may be included in the digital device 100 as separate elements. And, the above-described sensors may be included in the digital device 100 in a manner of being integrated into at least one element.

Meanwhile, the sensor unit 101 may be provided together with the display unit 102. Hence, the control unit 103 can detect various user inputs performed on the display unit 102 through the sensor unit 101. For instance, in case that the sensor unit 101 includes a touch sensor, the control unit 103 can receive signals in accordance with various touch inputs performed on the display unit 102 by an user. Thus, according to the present specification, the sensor unit 101 and the display unit 102 can be implemented into a touchscreen by configuring a mutually layered structure.

The display unit 102 can output an image having a plurality of layers. The digital device 100 according to the present specification can simultaneously run at least two applications. In doing so, if the simultaneously running applications are outputted as images to the display unit 102, the applications are arranged on different layers, respectively. In this case, when at least two applications are outputted as images to the display unit 102, the 'layer' means a mutually arranged location of each of the applications. When screens of at least two applications are outputted through the display unit 102, there may exist a mutually overlapped part. In this case, the screen of the application located on an upper layer is outputted to a region upper than the screen of the application located on a lower layer. On the other hand, if an application is arranged on an upper layer, it can be the application that is recently used by an user. Hence, an application arranged on a most upper layer can be regarded as an application currently used by an user.

The control unit 103 can receive the signal from the sensor unit 101 and is able to control the display unit 102. Hence, the display unit 102 can output an image based on a digital content running in the control unit 103 or a control command. And, the control unit 103 controls a so-called 'COPY and PASTE' process, which will be described in detail in the following description, by a simple and convenient method different from the related art.

Meanwhile, the digital device 100 according to the present specification can include devices of various types capable of processing digital data and performing an operation corresponding to the processed digital data. By taking a smartphone having a touchscreen provided to its front side as one example, a control operation of the control unit 103 is described in the present specification. Yet, targets of the digital device 100 are non-limited by the example. And, the digital device 100 may include one of a mobile communication device, a notebook computer, a personal computer, a tablet computing device, a mobile navigation device, a portable video player, a PDA (personal digital assistant), and other similar devices.

In the following description, a new 'COPY and PASTE' controlling method of the control unit 103 is explained.

Figure 2:
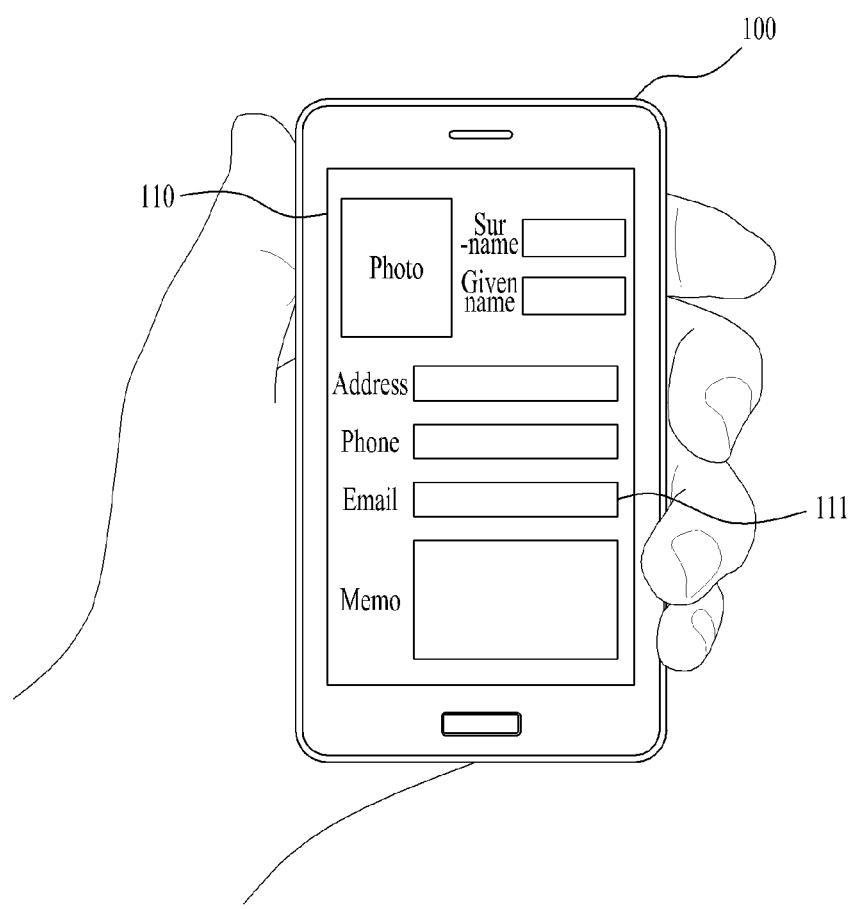
FIG. 2 is a diagram for one example of a first screen including a multitude of input windows.

FIG. 2 is a diagram for one example of a first screen 110 including a multitude of input windows.

Referring to FIG. 2, a smartphone is illustrated as one example of the digital device 100. An user attempts to input a new information to an address book of the digital device 100. And, assume that an information on 'email' among items included in the address book is in a chatting application. In particular, the user desires to 'COPY' the email information in the chatting application and then 'PASTE' it to an email input window 111 among input windows of an address book application.

First of all, the user inputs an action for selecting a screen of an application including the email input window 111 to the sensor unit 101. Having detected the user's input, the sensor unit 101 outputs a first signal. Subsequently, the control unit 103 receives the first signal from the sensor unit 101 and is then able to controls display of a first screen 110 of a first application on a first layer.

In this case, the first signal is the signal outputted to the control unit 103 by the sensor unit 101 having detected the user's input for selecting the screen of the application having the input window. In particular, the first signal is the signal corresponding to an user input for selecting a location to which an information is 'PASTED' in 'COPY and PASTE'. According to the example shown in FIG. 2, the sensor unit 101 detects an action of gripping the smartphone 'tightly' as an user input and then outputs the first signal.

The first screen 110 means a screen of an application having an input window to which a digital content will be inputted. And, the first screen 110 means a screen selected by an user as a location to which a digital content is desired to be 'PASTED'. The application can provide an user with various screens through the display unit 102. For instance, an address book application is able to provide an user with a page for displaying all saved lists, a page for displaying a list per group, a page for editing saved personal information, a page for saving new information and the like. In FIG. 2, the user takes an action of gripping the smartphone 'tightly' in the course of using the page for saving new information. Hence, the control unit 103 receives the first signal and then controls the page for saving the new information to be displayed as the first screen 110 on the first layer.

In this case, the first layer means a layer different from a second layer that will be described in the following description. In particular, the 'first' included in the 'first layer' is a name for indicating a layer different from the 'second' layer.

Figure 3:
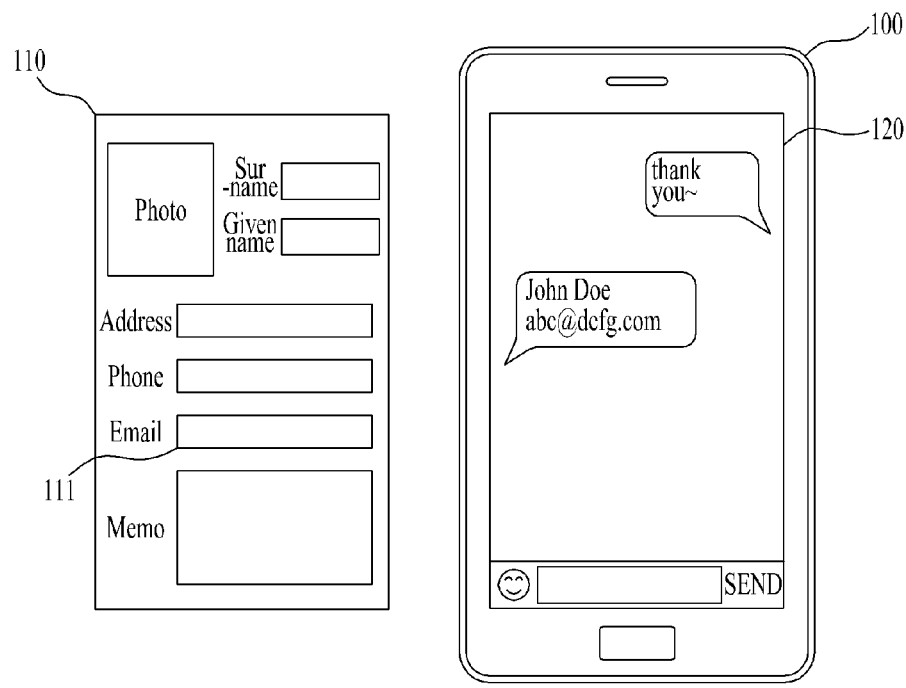
FIG. 3 is a diagram for one example of a second screen including a digital content.

FIG. 3 is a diagram for one example of a second screen 120 including a digital content.

Referring to FIG. 3, a digital device 100, on which a screen of a chatting application is displayed, is illustrated. As mentioned in the foregoing description, an email information (abc@defg.com) is included as a digital content in the chatting application.

An user inputs an action for selecting a screen of an application including the information to input (i.e., a digital content which becomes a 'COPY' target) to the sensor unit 101. Having detected the input, the sensor unit 101 outputs a second signal. Subsequently, the control unit 103 receives the second signal and is then able to controls display of a second screen 120 of a second application on a second layer.

In this case, the 'second signal' is the signal outputted by the sensor unit 101 by detecting an user input for selecting a screen of an application including a digital content. In particular, the second signal is the signal corresponding to an user input for selecting a location from which a digital content will be 'COPIED' in 'COPY and PASTE'.

The second screen 120 means a screen of an application having a digital content which will be 'COPIED'. And, the second screen 120 means a screen selected by a user as a location from which the digital content will be 'COPIED'.

Meanwhile, in FIG. 3, the first screen 110 is shown outside the digital device 100, whereby the first screen 110 and the second screen 120 can be distinguished from each other.

According to one embodiment of the present specification, the control unit 103 displays the first screen 110 on the first layer and is then able to provide the display unit 102 with an interface containing all screens of currently running applications. In this case, the interface is provided to an user to select the second screen 120.

Figure 4:
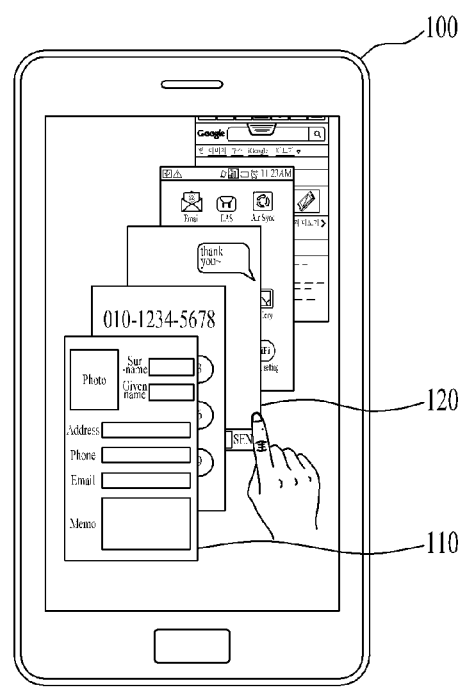
FIG. 4 is a diagram for one example of an user interface provided to an user to select a second screen.

FIG. 4 is a diagram for one example of an user interface provided to an user to select a second screen 120.

Referring to FIG. 4, screens of currently running applications are displayed on the display unit 102 of the digital device 100 in a manner of being stepped on different layers. An user is able to select the second screen 120 more easily from a plurality of application screens through an interface displayed on the display unit 102. The currently running applications are included in the interface. In doing so, an operating system (OS) for operating the digital device 100 is included in the currently running applications. Hence, it is possible to directly run an application, which is not currently run, through the interface in response to an user's intention. In particular, although an application is not run, it can be included in the interface.

FIG. 4 shows one embodiment for an user to select the display unit 102 by touching it with a finger. The sensor unit 101 detects the user's input of touching the display unit 102 with the finger and then outputs a second signal to the control unit 103. In particular, according to the embodiment shown in FIG. 4, the user's input for enabling the second signal to be outputted is an action of touching the display unit 102.

On the other hand, according to the embodiment shown in the present specification, the first screen 110 and the second screen 120 are screens of different applications, respectively. Yet, it is not mandatory for the first screen 110 and the second screen 120 to be the screens of the different applications, respectively. In particular, the first screen 110 and the second screen 120 may include the different page screens included in the same application. For instance, the first screen 110 may include a page for saving new information of an address book application, while the second screen 120 may include a saved personal information page. For another instance, the first screen 110 may include one tap of an internet browser application, while the second screen 120 may include another tap of the internet browser application.

According to one embodiment of the present specification, when the first signal is received, the control unit 103 raises the transparency of the first screen 110 and is able to control the second layer to be displayed on a layer lower than the first layer.

Figure 5:
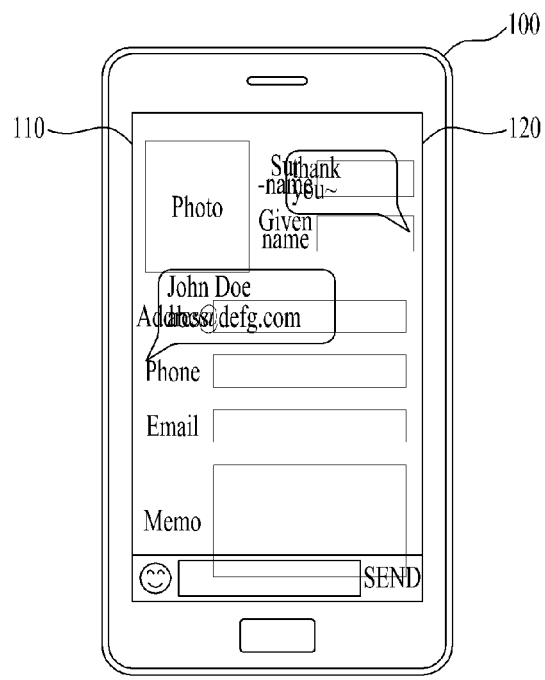
FIG. 5 is a diagram for one example that a first screen is displayed on a layer upper than that of a second screen.

FIG. 5 is a diagram for one example that a first screen 110 is displayed on a layer upper than that of a second screen 120.

Referring to FIG. 5, it is observed that the first screen 110 is represented as a relatively 'thin' line. On the contrary, it is observed that the second screen 120 is represented as a relatively 'thick' line. The reason for the first screen 110 to be represented as the relatively thin line is to indicate that the transparency is raised.

According to one embodiment, the first screen 110 is displayed on a layer upper than the second screen 120. In doing so, the transparency of the first screen 110 is raised. Hence, despite that the first screen 110 and the second screen 120 overlap each other, an user can simultaneously check the first screen 110 and the second screen 120 on the display unit 102.

Meanwhile, the control unit 103 can adjust the transparency of the first screen 110 by receiving a transparency adjust signal from the sensor unit 101. In this case, the transparency adjust signal is the signal outputted to the control unit by the sensor unit 101 having detected an user input for adjusting the transparency of the first screen 101. In particular, the user is able to directly adjust the transparency of the first screen 110 appropriate for simultaneously checking the first screen 110 and the second screen 120. To this end, the control unit 103 can control an interface for adjusting the transparency of the first screen 110 to be displayed on the display unit 102.

Meanwhile, the control unit 103 can control the transparency of an input window included in the first screen 110 to be raised higher than that of a region of the first screen 110 except the corresponding input window. Preferably, the control unit 103 raises the transparency of the input window included in the first screen 110 into a highest level, thereby enabling the region corresponding to the input window to look like being perforated.

Moreover, in case that a plurality of input windows is included in the first screen 110, the control unit 103 receives an input window select signal from the sensor unit 101 and is then able to control a transparency of the input window corresponding to the user's selection to be raised higher only. In this case, the input window select signal includes a signal outputted to the control unit 103 by the sensor unit 101 having detected an user input of selecting a prescribed one of a plurality of the input windows included in the first screen 110.

According to another embodiment of the present specification, when the second signal is received, the control unit 103 raises the transparency of the second screen 120 and controls the first layer to be displayed on a layer lower than the second layer. According to the present embodiment, the control unit 103 can adjust the transparency of the second screen 120 by receiving a transparency adjust signal from the sensor unit 101.

According to one embodiment of the present specification, the control unit 103 receives a shift signal from the sensor unit 101 and is then able to shift a location at which the first screen 110 or the second screen 120 is displayed.

Figure 6:
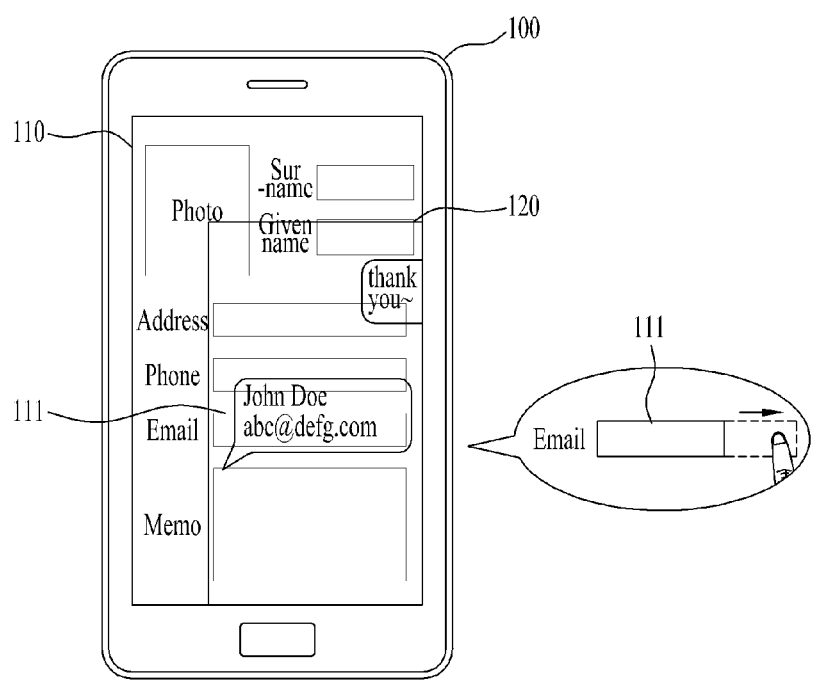
FIG. 6 is a diagram for an embodiment that a second screen displayed location is shifted.

FIG. 6 is a diagram for an embodiment to shift a location at which a second screen 120 is displayed.

Referring to FIG. 6, it is observed that the second screen 120 has been shifted to a right bottom end unlike the second screen of the former embodiment shown in FIG. 5. According to the present embodiment, it is intended to input an email information included in the second screen 120 to an email input window 111 included in a first screen 110. Hence, a location of the email information included in the second screen 120 is matched to a location corresponding to a region of the email input window 111 included in the first screen 110 by shifting the second screen 120.

The shift signal is the signal outputted to the control unit 103 by the sensor unit 101 having detected an user input for intending to shift a location at which the first screen 110 or the second screen 120 is displayed.

Meanwhile, although FIG. 6 shows one example that the second screen 120 is shifted by the shift signal, it is possible to implement an embodiment that the first screen 110 is shifted by the shift signal.

According to one embodiment of the present specification, the control unit 103 can adjust a size of an input window included in the first screen 110 by receiving a size adjust signal from the sensor unit 101.

Referring now to FIG. 6, in can be observed that a size of the email input window 111 included in the first screen 110 is smaller than that of the email information included in the second screen 120. Hence, an user can adjust the size of the email input window 111 included in the first screen 110 to fit the size of the email information included in the second screen 120. The size adjust signal is the signal outputted to the control unit 103 by the sensor unit 101 having detected an user input for adjusting the size of the input window included in the first screen 110. A partially enlarged diagram of FIG. 6 shows one embodiment that the size of the email input window 111 is enlarged in a manner of pulling one edge of the email input window 111 with a finger. Moreover, it is possible to implement an embodiment of reducing a size of an input window as well as the former embodiment shown in FIG. 6. Besides, the sensor unit 101 receives one of various user's inputs including the finger-pulling method and is then able to output the size adjust signal.

According to another embodiment of the present specification, the control unit 103 can adjust a location of an input window included in the first screen 110 by receiving a location adjust signal from the sensor unit 101. In this case, the location adjust signal is the signal outputted to the control unit 103 by the sensor unit 101 having detected an user input for adjusting a location of an input window included in the first screen 110. By the location adjust signal, the input window included in the first screen 110 can be shifted to an user-desired location, i.e., a location at which a digital content included in the second screen 120 is located.

Meanwhile, after the second screen 120 has been displayed on a second layer, the control unit 103 receives a third signal from the sensor unit 101 and is then able to input a digital content, which is included in the second screen 120 located in a region corresponding to an input window region included in the first screen 110, to an input window of the first screen 110.

Figure 7:
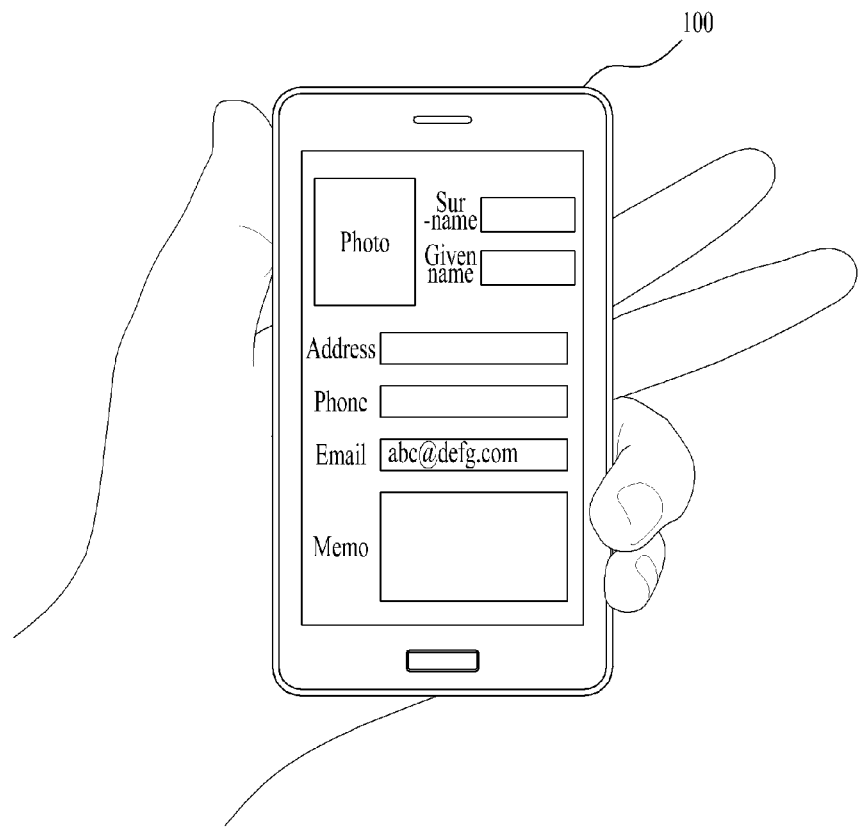
FIG. 7 is a diagram for one example that a digital content is inputted to an input window.

FIG. 7 is a diagram for one example that a digital content is inputted to an input window.

Referring to FIG. 7, it is observed that an email information is inputted to the email input window 111 among the input windows included in the first screen 110. Referring now to FIG. 6, the email information (abc@defg.com) was the text information included in the second screen 120 located in the region corresponding to the region of the email input window 111 included in the first screen 110. And, FIG. 7 shows a state that the control unit 103 receives the third signal from the sensor unit 101 and then inputs the email information (abc@defg.com) included in the second screen 120 located in the region corresponding to the region of the email input window 111 included in the first screen 110.

In this case, the third signal is the signal outputted to the control unit 103 by the sensor unit 101 having detected an user input for intending to input a digital content included in the second screen 120 to an input window included in the first screen 110. In particular, the third signal is the signal corresponding to an user input for executing 'PASTE' in 'COPY and PASTE'. According to the example shown in FIG. 7, the sensor unit 101 outputs the third signal by detecting an action performed in a manner that fingers, with which the digital device 100 is gripped, are partially detached from the digital device 100 as an user input.

Meanwhile, if the control unit 103 raises a transparency of the first screen 110 in case of receiving the first signal, the control unit 103 can lower the transparency of the first screen 110 in case of receiving the third signal. Preferably, the control unit 103 can return to an initial state by lowering the transparency of the first screen 110 into the minimum.

The digital contents mean to include digital data of various types including image, video and the like as well as text.

According to one embodiment of the present specification, if the digital content includes a plurality of texts, the control unit 103 can provide the display unit 102 with a text region select interface for selecting the texts entirely or in part.

Figure 8:
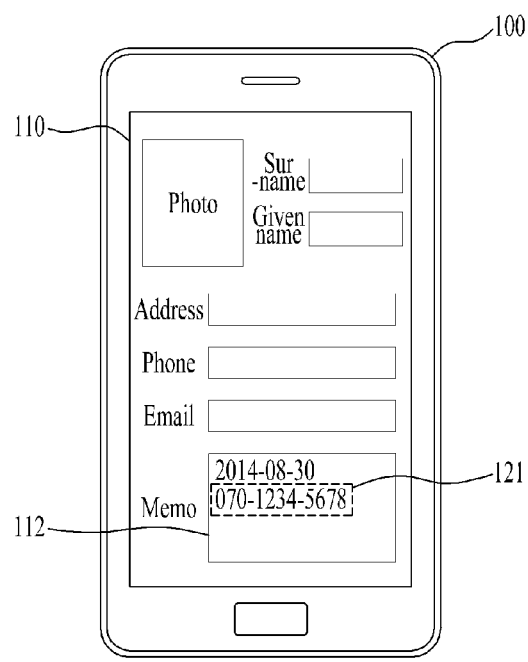
FIG. 8 is a diagram for one example of a text region select interface provided to a display unit.

FIG. 8 is a diagram for one example of a text region select interface 121 provided to a display unit 102.

Referring to FIG. 8, it is observed that a text region select interface 121 is represented as a dotted line in a region of a memo input window 112. According to the embodiment shown in FIG. 8, for clarity and simplification of the drawing, a second screen 120 is not fully illustrated but a part corresponding to the region of the memo input window 112 included in a first screen 110 is illustrated only. In particular, the numerals appearing in the region of the memo input window 112 included in the first screen 110 indicate digital contents included in the second screen 120.

Two digital contents included in the second screen 120 indicate a date related numeral information (located above) and a contact related numeral information (located below). In this case, an user selects the contact related numeral information from the date related numeral information and the contact related numeral information and then intends to input the selected information to the memo input window 112 included in the first screen 110 only. In doing so, the control unit 103 confirms that the digital content includes a plurality of texts and is then able to provide the display unit 102 with the text region select interface 121 for selecting the texts entirely or in part. The user can select the user-desired texts entirely or in part through the text region select interface 121. When the third signal is received, the control unit 103 can input the selected partial or full texts to the input window of the first screen 110 through the text region select interface 121.

According to another embodiment of the present specification, in case that the digital content includes an image, the control unit 103 can provide the display unit 102 with an image region select interface for selecting the image entirely or in part.

Figure 9:
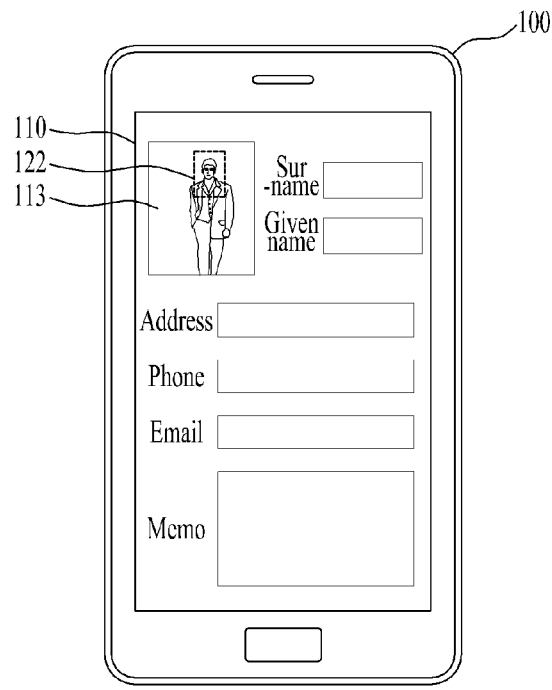
FIG. 9 is a diagram for one example of an image region select interface provided to a display unit.

FIG. 9 is a diagram for one example of an image region select interface 122 provided to a display unit 102.

Referring to FIG. 9, it is observed that an image region select interface 122 is represented as a dotted line in a region of a photo input window 113. According to the embodiment shown in FIG. 9, for clarity and simplification of the drawing, a second screen 120 is not fully illustrated but a part corresponding to the region of the photo input window 113 included in a first screen 110 is illustrated only. In particular, the image appearing in the region of the photo input window 113 included in the first screen 110 indicates a digital content included in the second screen 120.

The image included in the second screen 120 indicates a full body (head to lower body) image of a character. In this case, an user selects a face part from the image and then intends to input the selected face part to the photo input window 113 included in the first screen 110 only. In doing so, the control unit 103 confirms that the digital content includes the image and is then able to provide the display unit 102 with the image region select interface 122 for selecting the image entirely or in part. The user can select the user-desired image entirely or in part through the image region select interface 122. When the third signal is received, the control unit 103 can input the selected partial or full image to the input window of the first screen 110 through the image region select interface 122.

According to another embodiment of the present specification, in case that the digital content includes an image containing a text image, the control unit 103 can convert the text image to text data through OCR (optical character recognition).

Figure 10:
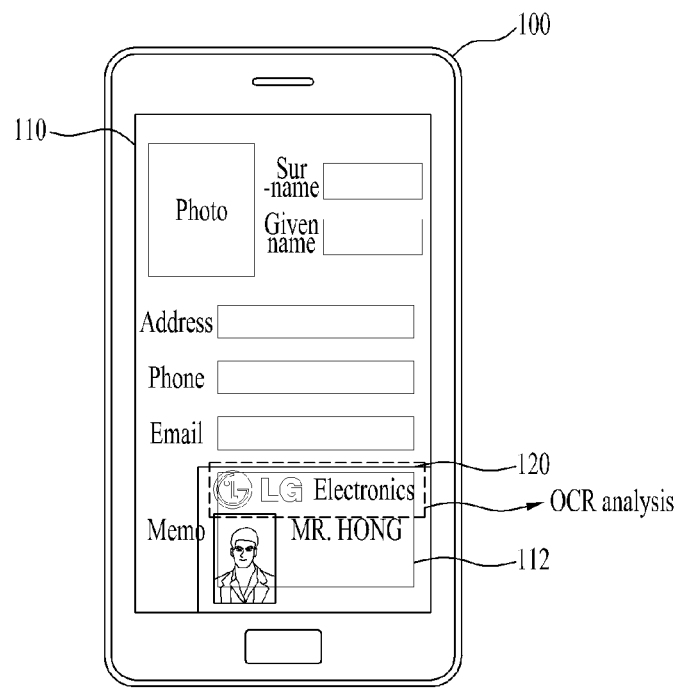
FIG. 10 is a diagram for one example of an image having an image of a text included in a second screen.

FIG. 10 is a diagram for one example of an image having a text image included in a second screen.

Referring to FIG. 10, it is observed that a business card image is included in the second screen 120. According to the embodiment shown in FIG. 10, for clarity and simplification of the drawing, the second screen 120 is not fully illustrated but a part corresponding to a region of a memo input window 112 included in a first screen 110 is illustrated only. In particular, an image appearing in the region of the memo input window 112 included in the first screen 110 is a digital image included in the second screen 120.

The image included in the second screen 120 is an image of a business card taken through a camera. An user desires to input a part 'LG Electronics', which is a company name, of the business card image to the memo input window 112 included in the first screen 110. In doing so, the control unit 103 confirms that the digital content is the image including the text image and is then able to convert the text image to text data through OCR (optical character recognition). Since the OCR technology has been known to the public at the timing of applying the present specification, its details shall be omitted from the following description. When the third signal is received, the control unit 103 can input the converted text data to the input window of the first screen 110.

According to another embodiment of the present specification, in case that the digital content includes an image containing a text image, the control unit 103 can provide the display unit 102 with a text input interface 123.

Figure 11:
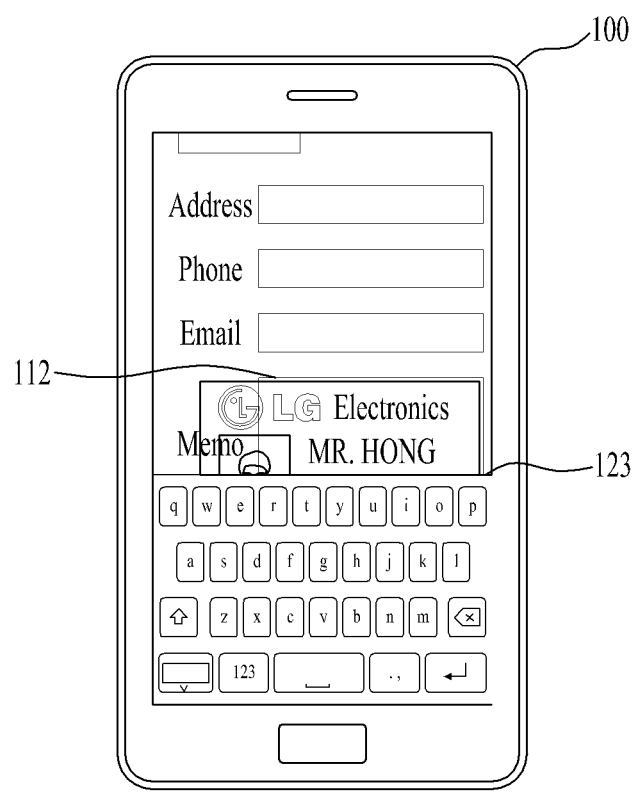
FIG. 11 is a diagram for one example that a text input interface is provided to a display unit.

FIG. 11 is a diagram for one example that a text input interface 123 is provided to a display unit 102.

Referring to FIG. 11, it is observed that a business card image is included in the second screen 120. According to the embodiment shown in FIG. 11, for clarity and simplification of the drawing, the second screen 120 is not fully illustrated but a part corresponding to a region of a memo input window 112 included in a first screen 110 is illustrated only. In particular, an image appearing in the region of the memo input window 112 included in the first screen 110 is a digital content included in the second screen 120. The control unit 103 confirms that the digital content is an image containing a text image and is then able to provide the text input interface 123 to the display unit 102. In doing so, an user is able to directly input an user-desired text content through the provided text input interface 123 while watching the image included in the second screen 120. When the $3^{rd}$ signal is received, the control unit 103 can input the text inputted through the text input interface 123 to the input window of the first screen 110. In this case, the third signal may include the signal outputted by the sensor unit 101 in case of a presence of an user's touch to an 'enter' button of the text input interface 123.

According to another embodiment of the present specification, in case that the digital content includes an image, the control unit 103 can save a part of the second screen 120 corresponding to a region of an input window included in the first screen 110 as image data. When the third signal is received, the control unit 103 can input the saved image data to the input window of the first screen 110. If an operation of the control unit 103 is understood as a concept of so-called 'screenshot', the understanding of the operation of the control unit 103 can be facilitated. According to the screenshot, an image appearing on the display unit 102 is outputted as it is. In particular, a part of the second screen 120 corresponding to a region of an input window included in the first screen 110 becomes the screenshot' by the third signal. And, an image of the screenshot part is inputted to the input window included in the first screen 110 as a digital content.

In the following description, a method of controlling the above-mentioned digital device 100 is explained. Yet, since the respective components of the digital device 100 are described in detail in the former description, redundant description shall be omitted from the following description.

Figure 12:
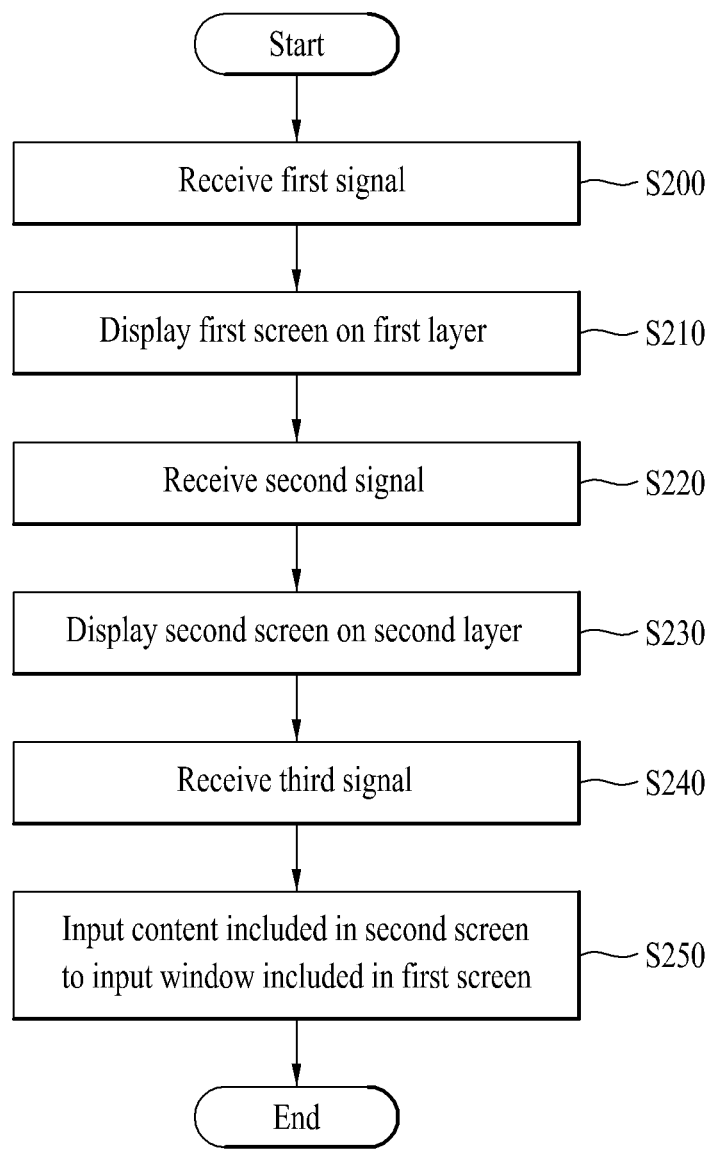
FIG. 12 is a flowchart of a method of controlling a digital device according to one embodiment of the present specification.

FIG. 12 is a flowchart of a method of controlling a digital device 100 according to one embodiment of the present specification.

Referring to FIG. 12, in a step S200, the control unit 103 can receive a first signal from the sensor unit 101. The control unit 103 finishes the step S200 and then goes to a step S210.

In the step S210, the control unit 103 can display the first screen on a first layer. The control unit 103 finishes the step S210 and then goes to a step S220.

According to one embodiment of the present specification, the control unit 103 finishes the step S210 and is then able to provide an interface including all screens of currently running applications to the display unit 102. Since the interface is already described with reference to FIG. 4, its redundant details shall be omitted from the following description.

In the step S220, the control unit 103 can receive a second signal from the sensor unit 101. The control unit 103 finishes the step S220 and then goes to a step S230.

In the step S230, the control unit 103 can display the second screen on a second layer. The control unit 103 finishes the step S230 and then goes to a step S240.

According to one embodiment of the present specification, the control unit 103 can control the second layer to be displayed on a layer lower than the first layer.

In doing so, when the first signal is received, the control unit 103 can raise a transparency of the first screen. And, the control unit 103 can adjust the transparency of the first screen by receiving a transparency adjust signal from the sensor unit 101.

Moreover, the control unit 103 can control the transparency of an input window region included in the first screen to be raised higher than that of the rest region of the first screen except for the input window. In doing so, if a plurality of input windows is included in the first screen, the control unit 103 receives an input window select signal from the sensor unit 101 and is then able to raise a transparency of an input window only in response to an user's selection.

According to another embodiment of the present specification, the control unit 103 can control the first layer to be displayed on a layer lower than the second layer. In doing so, when the second signal is received, the control unit 103 can raise a transparency of the second screen.

Meanwhile, the control unit 103 receives a shift signal from the sensor unit 101 and is then able to shift a location at which the first or second screen is displayed.

The control unit 103 receives a size adjust signal from the sensor unit 101 and is then able to adjust a size of an input window included in the first screen.

The control unit 103 receives a location adjust signal from the sensor unit 101 and is then able to adjust a location of an input window included in the first screen.

In the step S240, the control unit 103 can receive a third signal from the sensor unit 101. The control unit 103 finishes the step S240 and then goes to a step S250.

In the step S250, the control unit 103 can input a digital content included in the second screen, which is located in a region corresponding to a region of an input window included in the first screen, to the input window of the first screen.

According to one embodiment of the present specification, in case that the digital content includes a plurality of texts, the control unit 103 provides the display unit with a text region select interface for selecting the texts entirely or in part. When the third signal is received, the control unit 103 can input the text(s) selected entirely or in part through the text region select interface to the input window of the first screen.

According to another embodiment of the present specification, in case that the digital content includes an image, the control unit 103 can provide the display unit 102 with an image region select interface for selecting the image entirely or in part. When the third signal is received, the control unit 103 can input a partial or full region of the image selected through the image region select interface to the input window of the first screen.

According to another embodiment of the present specification, in case that the digital content includes an image containing a text image, the control unit 103 converts the text image to text data through optical character recognition (OCR). When the third signal is received, the control unit 103 can input the converted text data to the input window of the first screen.

According to another embodiment of the present specification, in case that the digital content includes an image containing a text image, the control unit 103 provides a text input interface to the display unit. When the third signal is received, the control unit 103 can input a text inputted through the text input interface to the input window of the first screen.

According to further embodiment of the present specification, in case that the digital content includes an image, the control unit 103 saves a part of the second screen corresponding to a region of an input window included in the first screen as image data. When the third signal is received, the control unit 103 can input the saved image data to the input window of the first screen.

According to one embodiment of the present specification, if the control unit 103 raises a transparency of the first screen in case of receiving the first signal, the control unit 103 can lower the transparency of the first screen in case of receiving the third signal.

Meanwhile, through the whole specification, if a prescribed part 'includes' a prescribed component, it means that other components can be further included instead of excluding other components unless a presence of specially contrary disclosure. And, such a terminology disclosed in this specification as '~unit' and the like means a unit for processing at least one function or operation, which can be implemented with software, hardware, or a combination of software and hardware.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Moreover, for the facilitation of understanding in describing the embodiments of the present specification, a dependent configuration is described centering on an example added one by one. Yet, it is possible to implement an embodiment added by combination of at least two dependent configurations. Therefore, the scope of the present specification is non-limited by the embodiments disclosed in the present specification.

What is claimed is:

1. A digital device comprising:
    a sensor unit configured to detect a user input, and output a signal in accordance with the detected input;
    a display unit; and
    a hardware-embedded control unit configured to:
    control the display unit to display a first screen of a first application on a first layer in response to a first user input sensed by the sensor unit, wherein the first user input is an action of gripping the digital device with all fingers with a predetermined tightness,
    after displaying the first screen on the first layer, control the display unit to display a second screen of a second application, in response to a second user input,
    display the second screen on a second layer over the first layer and with the second screen having a transparency such that the first screen is visible through the second screen, in response to a third user input for selecting the second screen,
    after displaying the second screen on the second layer, shift the second screen over the first screen so a digital content included in the second screen is matched to a location corresponding to an input window region included in the first screen, and
    input the digital content included in the second screen to the input window region of the first screen, in response to a fourth user input sensed by the sensor unit, wherein the fourth user input is an action of detaching some fingers on the digital device.

2. The digital device of claim 1, wherein the control unit is further configured to raise the transparency of the second screen and control the display unit to display the second layer on the first layer in response to the third user input.

3. The digital device of claim 1, wherein the control unit is further configured to adjust the transparency of the second screen by receiving a transparency adjust signal from the sensor unit.

4. The digital device of claim 1, wherein the control unit is further configured to lower the transparency of the second screen in response to the fourth user input.

5. The digital device of claim 1, wherein after displaying the first screen on the first layer, the control unit is further configured to control the display unit to display an interface including all screens of currently running applications.

6. The digital device of claim 1, wherein the control unit is further configured to adjust a size of the input window included in the first screen by receiving a size adjust signal from the sensor unit.

7. The digital device of claim 1, wherein the control unit is further configured to:
    when the digital content comprises a plurality of text, control the display unit to display a text region select interface for selecting the text entirely or in part, and
    in response to the fourth user input, input the text selected entirely or in part through the text region select interface to the input window of the first screen.

8. The digital device of claim 1, wherein the control unit is further configured to:
    when the digital content comprises an image, control the display unit to display an image region select interface for selecting the image entirely or in part, and
    in response to the fourth user input, input the image selected entirely or in part through the image region select interface to the input window of the first screen.

9. The digital device of claim 1, wherein the control unit is further configured to:
    when the digital content comprises an image containing a text image, convert the text image to text data through optical character recognition (OCR), and
    in response to the fourth user input, input the converted text data to the input window of the first screen.

10. The digital device of claim 1, wherein the control unit is further configured to:
    when the digital content comprises an image containing a text image, control the display unit to display a text input interface, and in response to the fourth user input, input text inputted through the text input interface to the input window of the first screen.

11. The digital device of claim 1, wherein the control unit is further configured to:
  if the digital content comprises an image, save a part corresponding to the region of the input window included in the first screen as image data, and
  in response to the fourth user input, input the saved image data to the input window of the first screen.

12. A method of controlling a digital device, the method comprising:
  displaying a first screen of a first application on a first layer in response to a first user input sensed by a sensor unit, wherein the first user input is an action of gripping the digital device with all fingers with a predetermined tightness;
  after displaying the first screen on the first layer, displaying a second screen of a second application, in response to a second user input;
  displaying the second screen on a second layer over the first layer and with the second screen having a transparency such that the first screen is visible through the second screen, in response to a third user input for selecting the second screen;
  after displaying the second screen on the second layer, shifting the second screen over the first screen so a digital content included in the second screen is matched to a location corresponding to an input window region included in the first screen; and
  inputting the digital content included in the second screen to the input window region of the first screen, in response to a fourth user input sensed by the sensor unit, wherein the fourth user input is an action of detaching some fingers on the digital device.

13. The method of claim 12, wherein displaying the second screen further comprises adjusting a size of the input window included in the first screen by receiving a size adjust signal from the sensor unit.

\* \* \* \* \*